(12) United States Patent
Dubensky et al.

(10) Patent No.: US 7,891,210 B2
(45) Date of Patent: Feb. 22, 2011

(54) ADJUSTABLE MOTOR BASE FOR AN HVAC&R BLOWER MOTOR

(75) Inventors: Harold J. Dubensky, Columbia, PA (US); Wayne Joseph Pierjok, Gallatin, MO (US); Jyotindra S. Shah, York, PA (US); Martin Dale Weatherd, Stanberry, MO (US); Robert E. Bender, Red Lion, PA (US); Bryan Burnworth, Mercersburg, PA (US)

(73) Assignee: Johnson Controls Technology Company, Holland, MI (US)

( * ) Notice: Subject to any disclaimer, the term of this patent is extended or adjusted under 35 U.S.C. 154(b) by 534 days.

(21) Appl. No.: 12/019,080

(22) Filed: Jan. 24, 2008

(65) Prior Publication Data

US 2009/0191069 A1 Jul. 30, 2009

(51) Int. Cl.
 *F25D 17/06* (2006.01)
(52) U.S. Cl. .......................................... 62/419; 62/440
(58) Field of Classification Search .................... 62/419, 62/314, 414, 440, 467, 259.1; 417/359, 362, 417/313, 360, 234; 454/250, 251; 312/236, 312/351.7
See application file for complete search history.

(56) References Cited

U.S. PATENT DOCUMENTS

| | | | |
|---|---|---|---|
| 2,699,922 A | | 1/1955 | Herbst |
| 2,790,596 A | | 4/1957 | Stirling |
| 3,122,307 A | | 2/1964 | Wasson et al. |
| 3,785,433 A | | 1/1974 | Ballard |
| 4,186,655 A | | 2/1980 | Mallory et al. |
| 5,179,524 A | | 1/1993 | Parker et al. |
| 5,378,119 A | * | 1/1995 | Goertzen ................ 417/313 |
| 5,685,165 A | * | 11/1997 | Bigelow, Jr. ............ 62/420 |
| 5,738,167 A | | 4/1998 | Asbjornson et al. |
| 6,344,177 B1 | * | 2/2002 | Littleford ................ 423/210 |
| 6,494,681 B2 | | 12/2002 | Barry et al. |
| 7,038,342 B2 | | 5/2006 | Icarre et al. |
| 7,246,997 B2 | | 7/2007 | Liu et al. |
| 2005/0037878 A1 | * | 2/2005 | Pierjok et al. ........... 474/101 |

* cited by examiner

*Primary Examiner*—Mohammad M Ali
(74) *Attorney, Agent, or Firm*—McNees Wallace & Nurick LLC

(57) ABSTRACT

An HVAC&R system including a blower system having a vertical motor adjustment is provided. The HVAC&R system includes a cooling unit, a heating unit, an air conditioning unit, and a blower unit. The blower unit includes a blower assembly having a fan unit within a fan unit support frame. A motor attached to a height adjustable motor base is attached to a top surface of the fan unit support frame.

17 Claims, 6 Drawing Sheets

ADJUSTABLE MOTOR BASE FOR AN HVAC&R BLOWER MOTOR

BACKGROUND

The application generally relates to heating, ventilation, air conditioning and refrigeration (HVAC&R) systems. The application relates more specifically to a motor base for supporting a motor disposed on top of a fan unit.

Fans are incorporated into different types of machines and systems including HVAC&R systems. Both residential and commercial HVAC&R systems utilize supply and exhaust or return air fans. For example, fans may be used to draw air across or to push air over a plurality of heat exchange coils. The heat exchange coils may heat or cool the air, depending upon the fluid supplied to the heat exchange coils.

Forward curved or backward inclined centrifugal blowers are used in these types of HVAC&R units where duty is comparatively light and it is desirable to keep the initial cost of the HVAC&R unit low. Most often, the fan component of the blower unit is driven by a motor located proximate to the fan. The motor typically drives the fan by a belt.

The motor is frequently mounted on a side of the blower unit, which impacts the work zone around the blower. Alternatively, the motors may be disposed on top of the blower unit in a clam-shell or on a sliding motor base, which may significantly increase the height of the blower cabinet. Additionally, the belts in these designs are difficult to tighten and place excessive stress on the fan bearings.

What is needed is a blower unit having a reduced footprint and reduced overall cabinet height requirement. Also, the blower unit should be easily accessible and provide for balance adjustment.

Intended advantages of a system and/or method satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

SUMMARY

One embodiment is directed to an HVAC&R system including a chiller, a heating system, an air conditioning unit, and air inlet duct for providing outside and/or return air to the conditioning unit, a blower unit, and an air discharge duct for distributing the conditioned air. The blower unit includes a fan unit disposed within a fan unit support frame, the fan unit support frame having a top surface, and a motor attached to an adjustable motor base. The adjustable motor base includes a motor mounting section having a top surface and a frame mounting section having a bottom panel. The motor is secured to the top surface of the motor mounting section of the adjustable motor base and the bottom panel of the frame mounting section is secured to the top surface of the fan support frame, and the vertical distance between the top surface of the motor mounting section and the bottom panel of the frame mounting section is adjustable.

Another embodiment is directed to a blower unit including a fan unit disposed within a fan unit support frame, the fan unit support frame having a top surface. A motor is attached to an adjustable motor base for driving the fan. The adjustable motor base includes a motor mounting section having a top surface and a frame mounting section having a bottom panel. The motor is secured to the top surface of the motor mounting section of the adjustable motor base and the bottom panel of the frame mounting section is secured to the top surface of the fan support frame, and the vertical distance between the top surface of the motor mounting section and the bottom panel of the frame mounting section is adjustable.

Another embodiment is directed to a method of adjusting the tension of a belt of a blower assembly of an HVAC&R system including providing a fan unit disposed within a fan unit support frame, the fan unit support frame having a top surface, providing a motor attached to an adjustable motor base, and adjusting the vertical height adjustment bolts to obtain a desired amount of tension in the belt. The adjustable motor base includes a motor mounting section and a frame mounting section. The motor mounting section includes a front side, a rear side, and a top surface. The frame mounting section includes a front panel, a rear panel, and a bottom panel. The motor is secured to the top surface of the motor mounting section of the adjustable motor base and the bottom panel of the frame mounting section is secured to the top surface of the fan support frame, and the vertical distance between the top surface of the motor mounting section and the bottom panel of the frame mounting section is adjustable by adjusting vertical height adjustment bolts configured between the top surface and the bottom surface.

One advantage of the disclosed system and unit is a reduction in blower unit space requirements.

Another advantage of the disclosed system and unit is balance adjustability of the motor.

Yet another advantage of the disclosed system and unit is adjustment to fan/motor belt tension.

Still another advantage of the disclosed system and unit is a reduced system cost and increased efficiency, when compared to conventional systems.

Another advantage of the disclosed system and unit is simple and reliable implementation of the system and unit.

Alternative exemplary embodiments relate to other features and combinations of features as may be generally recited in the claims.

DETAILED DESCRIPTION OF THE EXEMPLARY EMBODIMENTS

Figure 1:
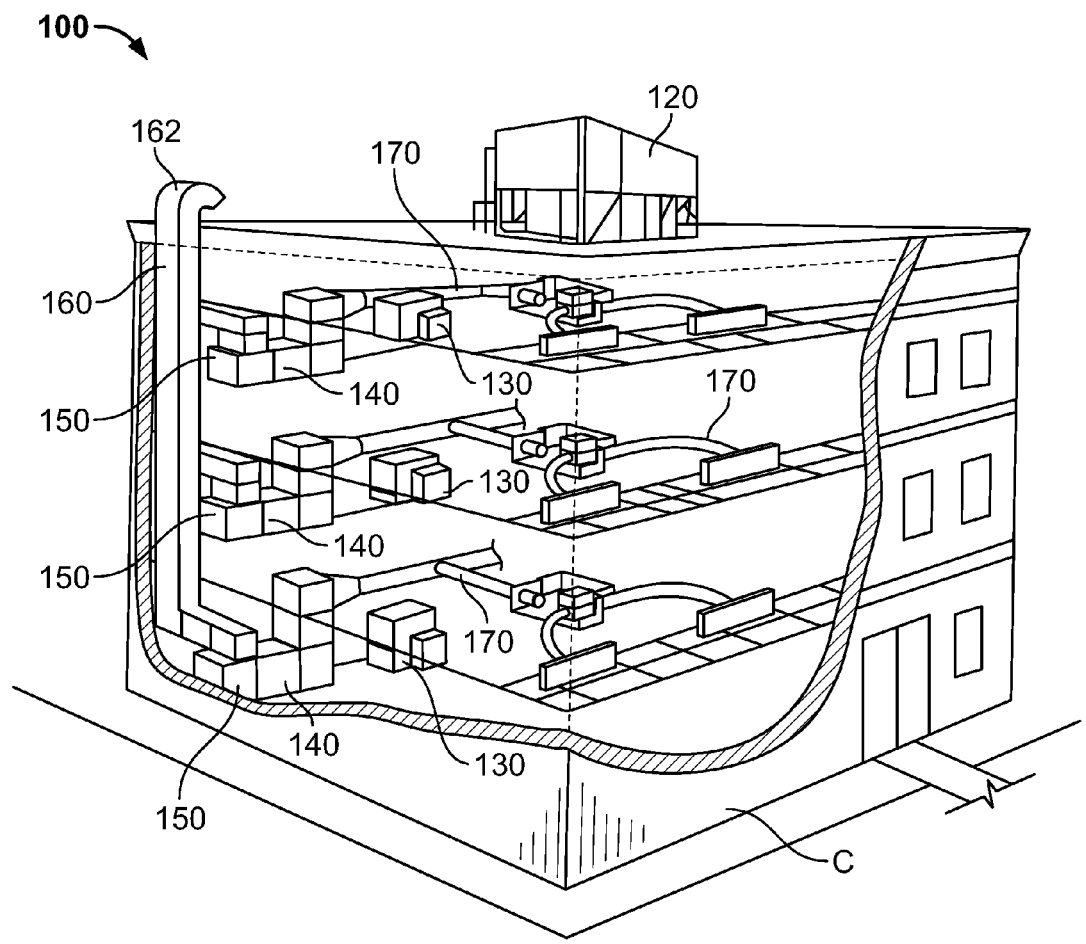
FIG. 1 is an illustration of an exemplary HVAC&R system disposed in a commercial setting.

FIG. 1 shows an exemplary HVAC&R system 100 in a typical commercial setting C. The system 100 includes a cooling system 120, a heating system 130, an air inlet duct 160, an air conditioning unit 150, a blower unit 140, and a discharge duct 170. The system 100 is shown with a separate heating system 130, blower unit 140, heat exchange unit 150 on each floor of the commercial setting C, but it should be appreciated by one of ordinary skill in the art that these components may be shared between floors. For example, in an alternative embodiment, the system 100 includes only one component of each type that provides conditioned air to the commercial setting C. The cooling system 120 include a chiller for providing a coolant or refrigerant to the air conditioning unit 150, and the heating system 130 may include a boiler for providing hot water or heated fluid to the air conditioning unit 150. The system 100 includes many other features that are not shown and/or described in FIG. 1. These features have been purposely omitted to simplify the drawing for ease of illustration.

The air inlet duct 160 includes an outside opening 162 that allows outside air to enter the air inlet duct 160. The blower unit 140 draws outside air from the outside opening 162 and/or return air through the air inlet duct 160. The blower unit 140 then draws the outside and/or return air through the air conditioning unit 150 to be cooled or heated by exchanging heat with coolant or hot water, respectively. The conditioned air is then distributed throughout the commercial unit C by the discharge duct 170.

Figure 2:
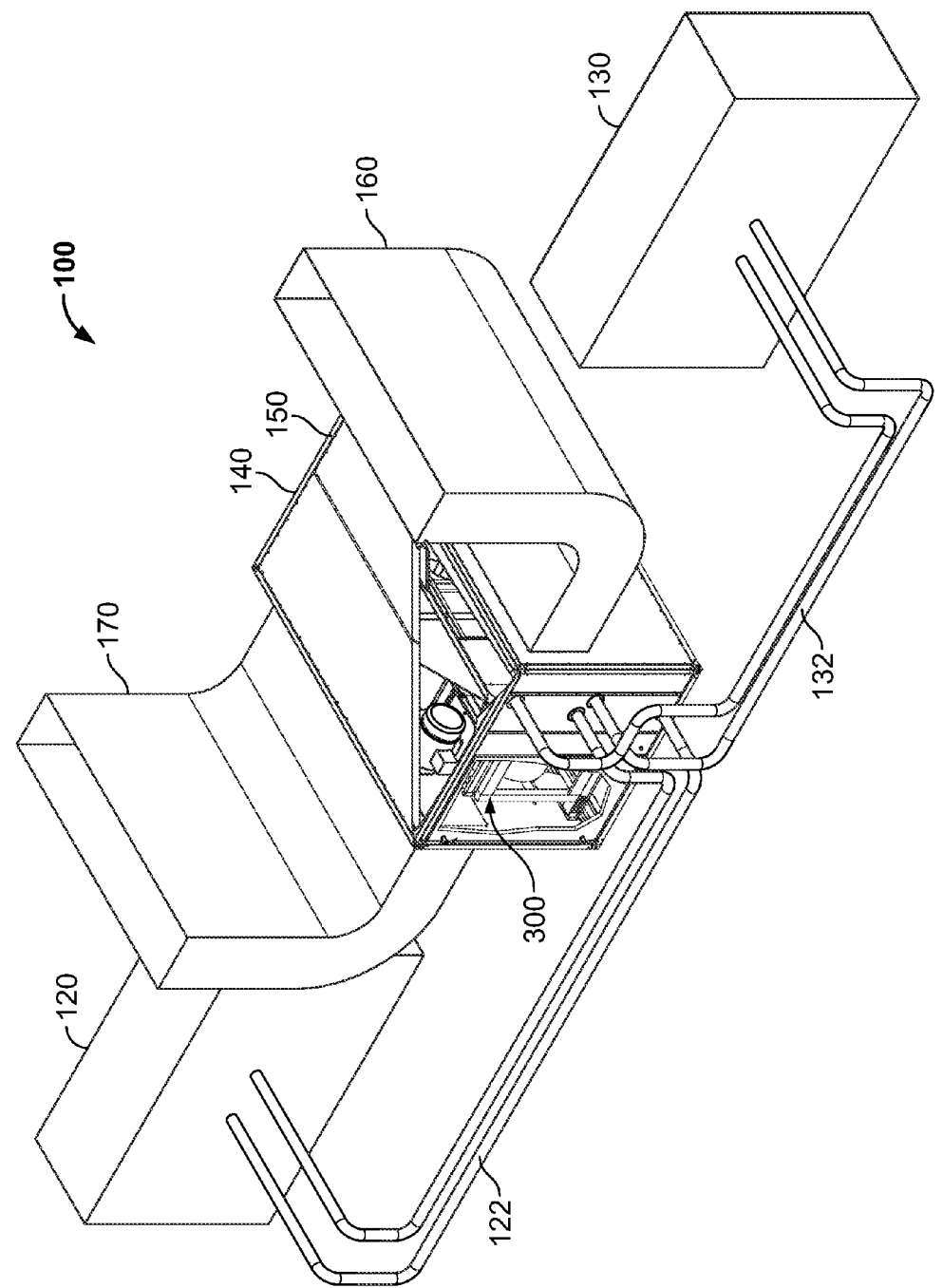
FIG. 2 is an illustration of an exemplary air handling system according to an exemplary embodiment of the disclosure.

FIG. 2 is an illustration of the exemplary HVAC&R system 100. As can be seen in FIG. 2, the air conditioning unit 150 is provided with coolant from the cooling system 120 by coolant piping 122. The air conditioning unit 150 is also provided with hot water from the heating system 130 by heating fluid piping 132. The air conditioning unit 150 includes heat exchange coils (not shown) that receive the coolant and hot water.

The blower unit 140 includes a blower assembly 300 that draws air from the air inlet duct 160, and over heat exchange coils (not shown) within the air conditioning unit 150 to cool or heat the conditioned air as required. The blower assembly 300 pressurizes the blower unit 140, which forces air through the discharge duct 170 for distribution. The blower unit 140 is shown with one blower assembly 300, however, in alternative embodiments the blower unit 300 may include two or more blower units to increase flow, evenly distribute flow, and/or to provide system redundancy.

Figure 3:
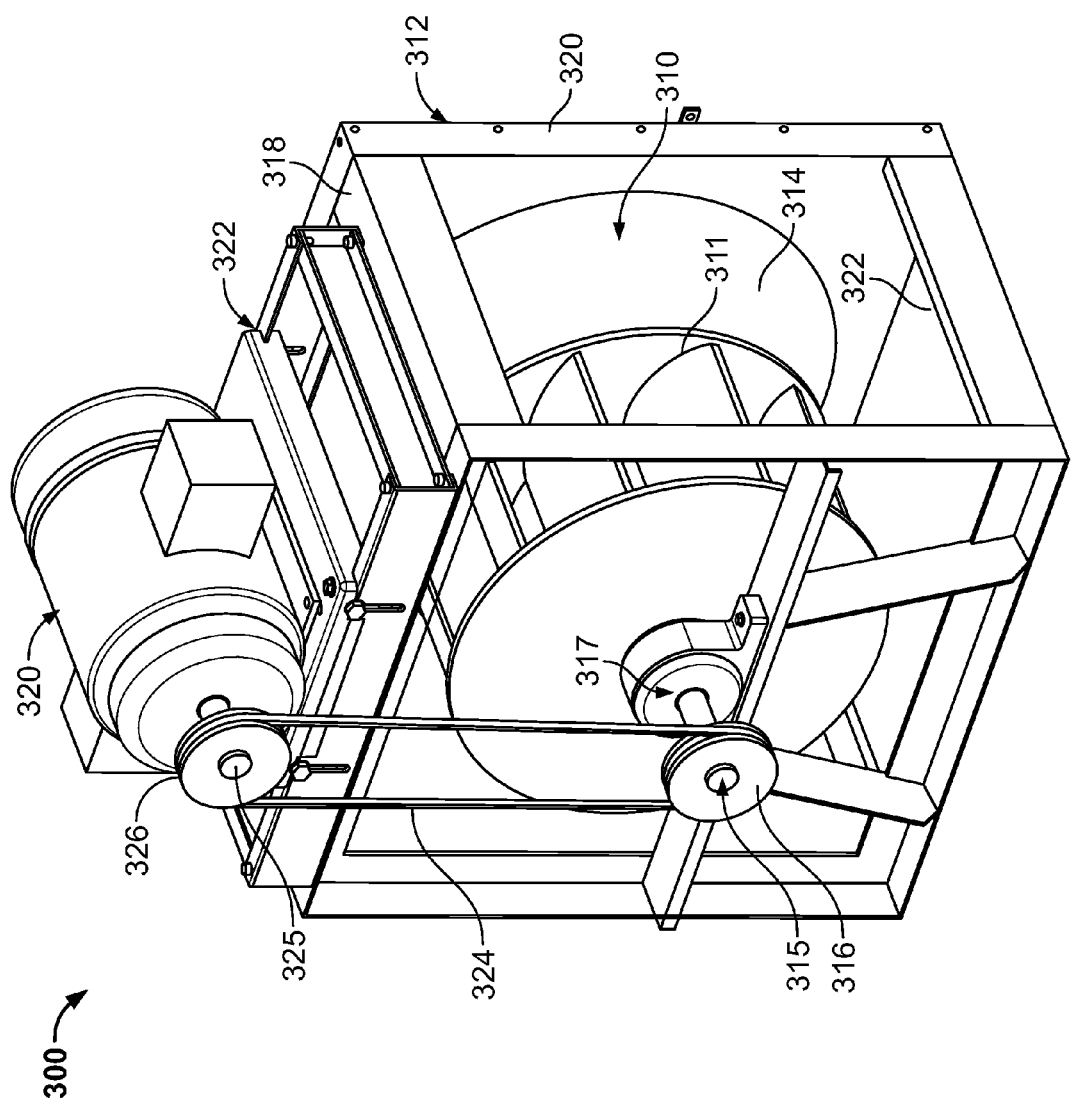
FIG. 3 is an illustration of an exemplary blower assembly.

FIG. 3 shows an exemplary blower assembly 300. Blower assembly 300 includes a fan unit 310, a fan unit support frame 312, a motor 320, a motor base 322 and a drive belt 324. Motor 320 includes a motor shaft 325 attached to a motor pulley 326. The fan unit 310 includes a plenum fan 311, a plenum fan inlet 314, a fan shaft 315 attached to a fan shaft pulley 316, and a fan shaft bearing 317. The fan unit 310 is mounted within the fan unit support frame 312. Fan unit support frame 312 includes a top surface 318, side sections 320, and a bottom section 322. The drive belt 324 movably engages the motor shaft 321 and the fan shaft 315 in order for the fan 312 to be rotated when the motor 320 is activated. In alternative embodiments, the plenum fan 311 may be another type of fan, such as, but not limited to, other types of centrifugal fans.

As shown in FIG. 3, the motor 320 is disposed on the motor base 322. The motor may be an AC induction motor, Single or Three Phase, Open or Closed Type Enclosure, or other similar motor. The motor 320 is provided with power and control systems (not shown) as would be appreciated by one of ordinary skill in the art.

Figure 4:
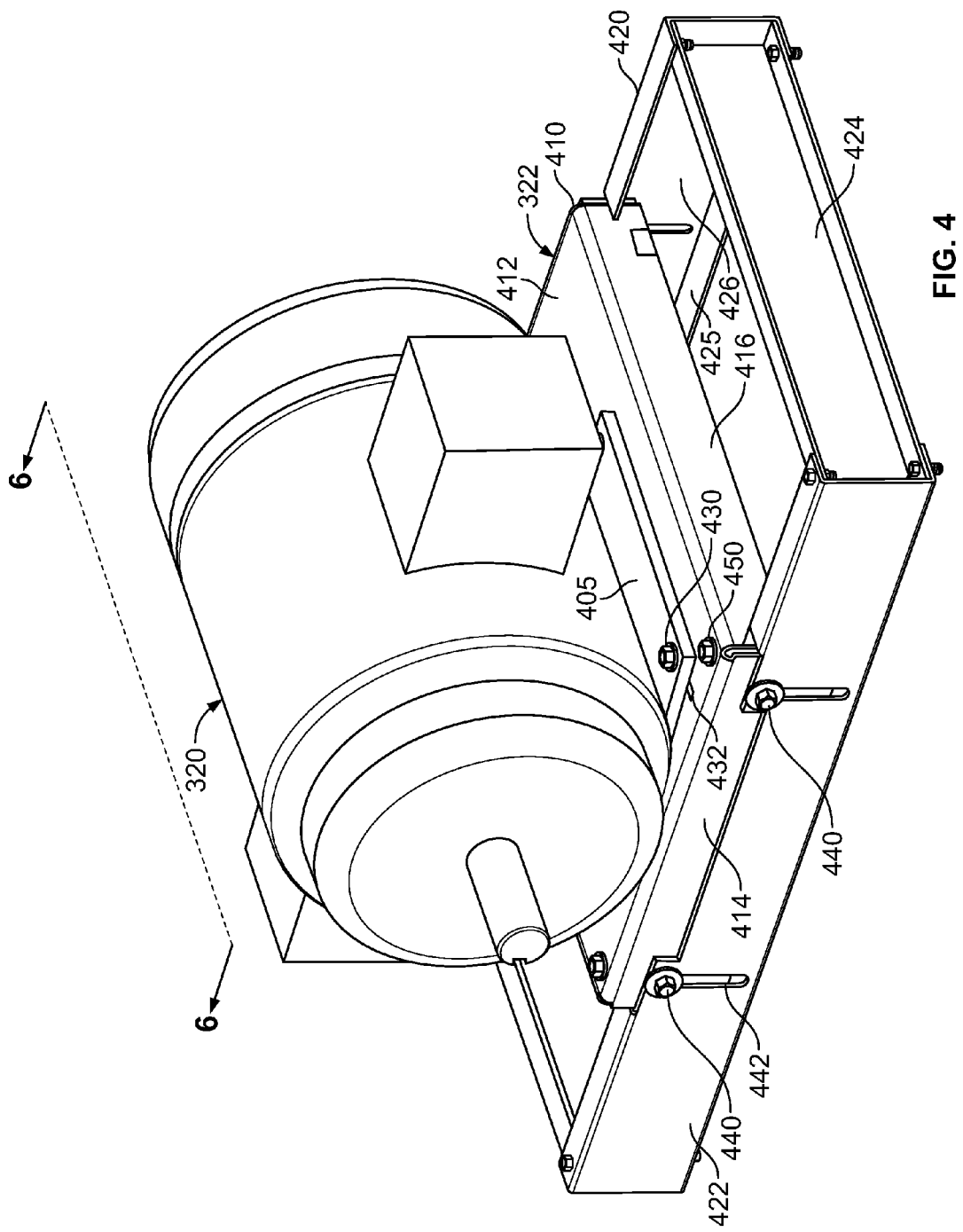
FIG. 4 is an illustration of a front view of an exemplary arrangement of a motor and motor base.

FIG. 4 shows an exemplary front perspective view of the motor 320 disposed on the motor base 322. As can be seen in FIG. 4, the motor includes a motor mounting bracket 405, and the motor base 322 includes a motor mounting section 410 and a frame mounting section 420. The motor mounting section 410 includes a top surface 412, a front side 414, lateral sides 416, and a rear side (not shown). The motor mounting section 410 also includes vertical adjustment bolts 450. The frame mounting section 420 includes a front panel 422, side panels 424, a bottom panel 425, and a rear panel 426. It is to be understood that orienting terms such as top, side and front are intended to assist in understanding the disclosure and are not limiting. The frame mounting section 420 may be securely attached to the top surface 318 (FIG. 3) of the fan unit support frame 312 (FIG. 3) by securely attaching the bottom panel 425 to the top surface 318 by fasteners (not shown) such as bolts, or alternatively, the frame mounting section 420 may be secured to the top surface 318 by welding or other similar attachment method.

The motor 320 is attached to the motor base by mounting bolts 430 secured through base slots 432 in the top surface 412 of the motor mounting section 410. The base slots 432 allow the motor 320 adjustable horizontal movement between the front side 414 and the rear side (not shown) of the motor mounting section 410.

The motor mounting section 410 is attached to the frame mounting section 420 by motor base bolts 440 received through mounting slots 442 in the front panel 422 of the frame mounting section 420 and received in holes (not shown) in the front side 414 of the motor mounting section 410. In an alternative embodiment, the holes (not shown) may be threaded to engage the motor base bolts 440. The mounting slots 442 allow the motor mounting section 410 adjustable vertical movement relative to the frame mounting section 420, and the motor base bolts 440 securely fix the motor mounting section 410 to the frame mounting section 420 at a predetermined adjustable position.

Figure 5:
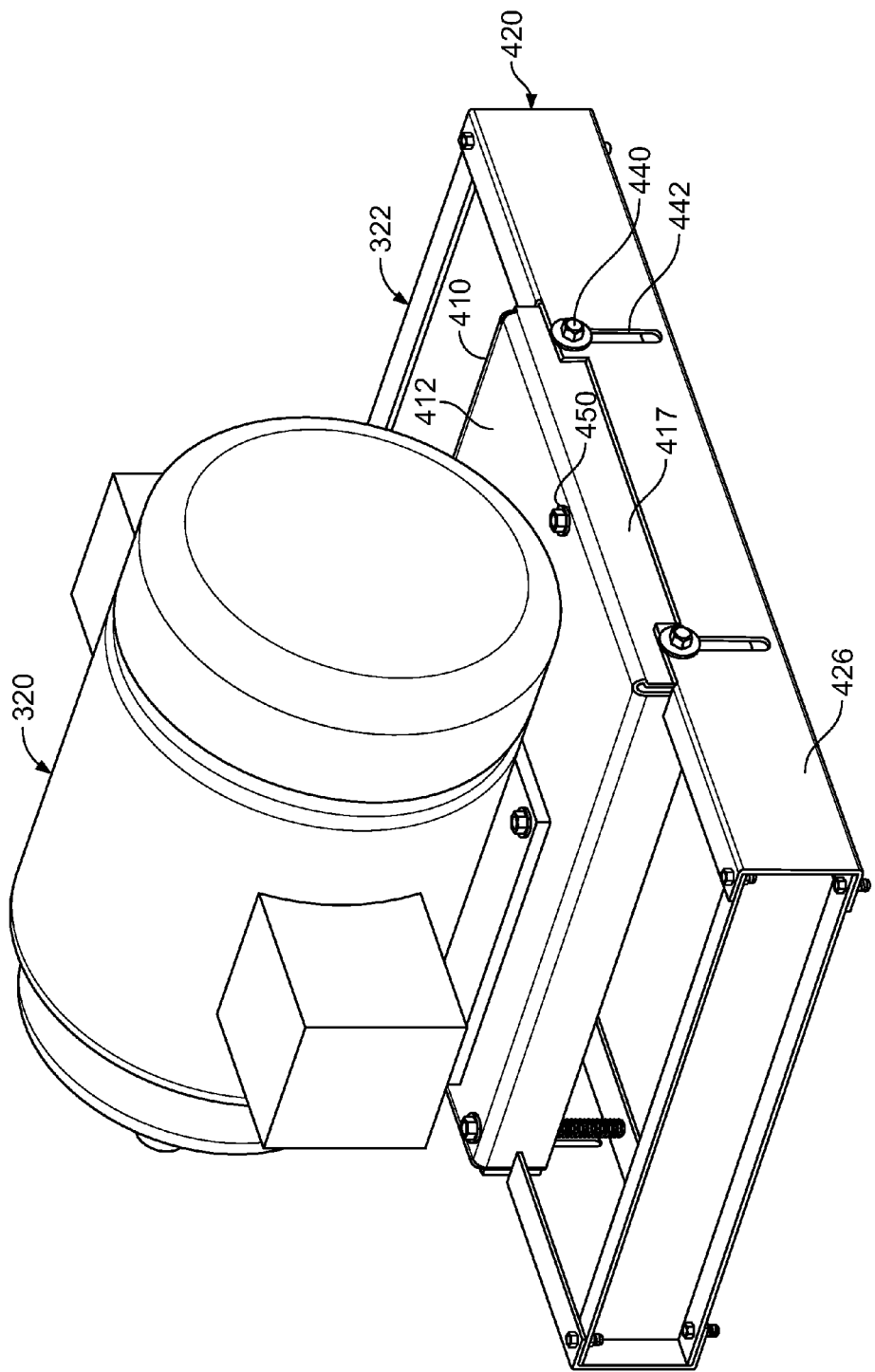
FIG. 5 is an illustration of a rear view of the exemplary arrangement of a motor and motor base of FIG. 4

FIG. 5 shows an exemplary rear perspective view of the motor 320 disposed on the motor base 322. FIG. 5 shows the rear side 417 of motor mounting section 410, and the rear panel 426 of the frame mounting section 420. As can be seen in FIG. 5, a vertical adjustment bolt 450 is disposed proximate the rear side 417. Additionally, motor base bolts 440 are received through mounting slots 442 of the rear panel 426 and received through holes (not shown) in the rear side 417. The mounting slots 442 allow the motor mounting section 410 adjustable vertical movement relative to the frame mounting section 420, and the motor base bolts 440 securely fix the motor mounting section 410 to the frame mounting section 420 at a predetermined adjustable position.

Figure 6:
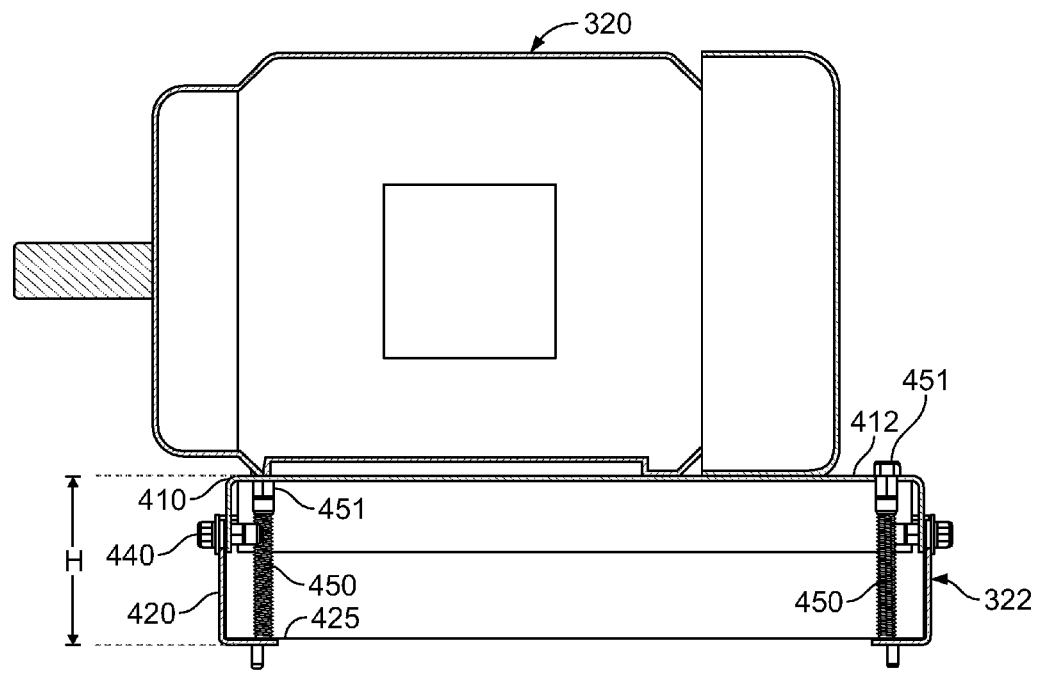
FIG. 6 is cross-section of the motor and motor base of FIG. 4 taken along line 6-6 at a height H.

FIG. 6 shows a cross section view of the motor 320 and motor base 322 taken across line 6-6 of FIG. 4 at a vertical height H. The vertical height H is the vertical distance between the top surface 412 and the bottom panel 425. As can be seen in FIG. 6, vertical adjustment bolts 450 are configured between the top surface 412 and the bottom panel 425 to adjust the vertical height H. As can be further seen in FIG. 6, threaded inserts 451 are press fit into the top surface 412 to receive the vertical height adjustment bolts 450. It should be appreciated by one of ordinary skill in the art, that by adjusting the vertical height H, the tension on the drive belt 324 (FIG. 3) may be adjusted. Furthermore, the positioning of the vertical adjustment bolts 450 around the perimeter of the top surface 412 as shown in FIG. 6 permits the top surface 412 to be leveled or otherwise adjusted to balance the motor 320. It should be appreciated by one of ordinary skill, that the number and placement of the vertical adjustment bolts 450 may vary and still achieve the vertical adjustment of the top surface 412.

As can be further seen in FIG. 6, the motor base bolts 440 secure the motor mounting section 410 to the frame mounting section 420 and secure the vertical height H at a predetermined position. To adjust the vertical height H, the motor base bolts 440 are loosened to allow vertical adjustment of the motor mounting section 410 by adjusting the vertical adjustment bolts 450 in a direction that provides a desired amount of vertical height adjustment to the top surface 412. After the motor mounting section 410 has been vertically adjusted to achieve the desired amount of vertical height adjustment to the top surface 412, the motor base bolts 440 are tightened to lock the motor base 322 into place and secure the top surface 412 at a fixed vertical height position.

Figure 7:
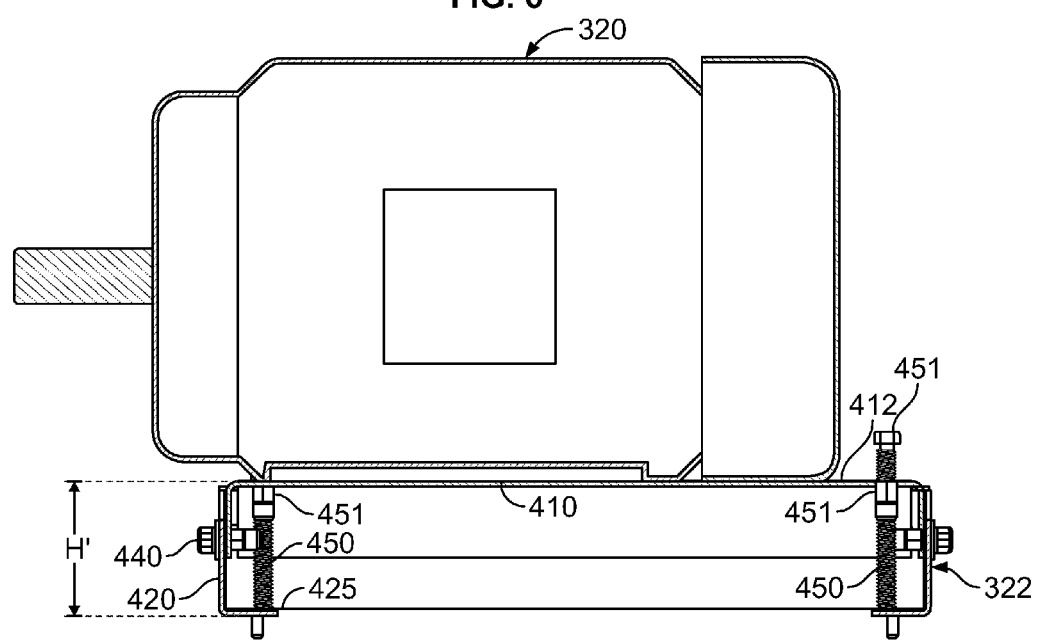
FIG. 7 is cross-section of the motor and motor base of FIG. 4 taken along line 6-6 at a height H'.

FIG. 7 shows a cross section view of the motor 320 and motor base 322 taken across line 6-6 of FIG. 3 at an adjusted vertical height H'. As can be seen in FIG. 7, the adjusted vertical height H' has been decreased from the vertical height H (FIG. 6) by adjusting the vertical adjustment bolts 450 as shown.

It should be understood that the application is not limited to the details or methodology set forth in the following description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the multichannel coil as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

What is claimed is:

1. An HVAC&R system, comprising:
   a chiller;
   a heating system;
   an air conditioning unit;
   and air inlet duct for providing outside air to the conditioning unit;
   an air discharge duct for distributing air conditioned by the conditioning unit; and
   a blower unit;
   wherein the blower unit comprises
      a fan unit disposed within a fan unit support frame, the fan unit support frame having a top surface;
      a motor attached to an adjustable motor base,
      the adjustable motor base comprising:
         a motor mounting section comprising a top surface including slots for adjusting the horizontal position of the motor; and
         a frame mounting section comprising a bottom panel;
         wherein the motor is secured to the top surface of the motor mounting section of the adjustable motor base and the bottom panel of the frame mounting section is secured to the top surface of the fan support frame, and
         wherein the vertical distance between the top surface of the motor mounting section and the bottom panel of the frame mounting section is adjustable.

2. The system of claim 1, wherein the vertical distance is adjusted by adjusting vertical adjustment bolts configured between the top surface and the bottom panel.

3. The system of claim 1, wherein the frame mounting section further includes a front panel, side panels and a rear panel, the front panel and the rear panel comprising slots configured to receive bolts engaged in the motor mounting section for securely positioning the motor mounting section at a predetermined adjustable height from the bottom panel of the frame mounting section.

4. The system of claim 1, wherein the fan unit comprises a plenum fan.

5. The system of claim 1, wherein the motor comprises a motor shaft attached to a motor shaft pulley that engages a drive belt that urges a fan shaft pulley attached to a fan shaft to rotate a fan when the motor is activated.

6. The system of claim 5, wherein the fan is plenum fan.

7. A blower unit for an HVAC&R system, comprising:
   a fan unit disposed within a fan unit support frame, the fan unit support frame having a top surface;
   a motor attached to an adjustable motor base,
   the adjustable motor base comprising:
      a motor mounting section comprising a top surface including slots for adjusting the horizontal position of the motor; and
      a frame mounting section comprising a bottom panel;
      wherein the motor is secured to the top surface of the motor mounting section of the adjustable motor base and the bottom panel of the frame mounting section is secured to the top surface of the fan support frame, and
      wherein the vertical distance between the top surface of the motor mounting section and the bottom panel of the frame mounting section is adjustable.

8. The unit of claim 7, wherein the vertical distance is adjusted by adjusting vertical adjustment bolts configured between the top surface and the bottom panel.

9. The unit of claim 7, wherein the frame mounting section further includes a front panel, side panels and a rear panel, the front panel and the rear panel comprising slots configured to receive bolts attached to the motor mounting section for securely positioning the motor mounting section at a predetermined adjustable height from the bottom panel of the frame mounting section.

10. The unit of claim 7, wherein the fan unit comprises a plenum fan.

11. The unit of claim 7, wherein the motor comprises a motor shaft attached to a motor shaft pulley that engages a drive belt that urges a fan shaft pulley attached to a fan shaft to rotate a fan when the motor is activated.

12. The unit of claim 11, wherein the fan is plenum fan.

13. A method of adjusting the tension of a belt of a blower assembly of an HVAC&R system, comprising:

providing a fan unit disposed within a fan unit support frame, the fan unit support frame having a top surface;

providing a motor attached to an adjustable motor base, the adjustable motor base comprising:

a motor mounting section comprising a front side, a rear side, and a top surface including slots for adjusting the horizontal position of the motor; and a frame mounting section comprising a front panel, a rear panel, and a bottom panel;

wherein the motor is secured to the top surface of the motor mounting section of the adjustable motor base and the bottom panel of the frame mounting section is secured to the top surface of the fan support frame, and wherein the vertical distance between the top surface of the motor mounting section and the bottom panel of the frame mounting section is adjustable by adjusting vertical height adjustment bolts configured between the top surface and the bottom surface; and adjusting the vertical height adjustment bolts to obtain a desired amount of tension in the belt.

14. The method of claim 13, wherein a plurality of vertical height adjustment bolts are disposed around a perimeter of the top surface.

15. The method of claim 13, wherein two vertical height adjustment bolts are disposed proximate to the front side of the motor mounting section, and one vertical height adjustment bolts are disposed proximate to the rear side of the motor mounting section.

16. The method of claim 13, further comprising:

adjusting bolts received in slots disposed in the front panel and further received in holes in the front side; and adjusting bolts received in slots disposed in the rear panel and further received in holes in the rear side to the rear side to secure the top surface at a fixed vertical height from the bottom panel.

17. The method of claim 13, wherein the fan is plenum fan.

* * * * *